United States Patent [19]

Weller et al.

[11] Patent Number: 5,490,448
[45] Date of Patent: Feb. 13, 1996

[54] BEVERAGE BREWING MACHINE

[75] Inventors: Albrecht Weller, Steinbach; Georges Driesen, Niederhöchstadt; Andreas Peter, Kronberg; Peter Herber; Gerhard Schäfer, both of Frankfurt am Main; Stefan Schamberg, Usingen; Andreas Birk, Bad Homburg, all of Germany

[73] Assignee: Braun Aktiengesellschaft, Frankfurt, Germany

[21] Appl. No.: 204,308

[22] PCT Filed: Sep. 9, 1992

[86] PCT No.: PCT/EP92/02082

§ 371 Date: Mar. 10, 1994

§ 102(e) Date: Mar. 10, 1994

[87] PCT Pub. No.: WO93/05691

PCT Pub. Date: Apr. 1, 1993

[30] Foreign Application Priority Data

Sep. 13, 1991 [DE] Germany .................. 41 30 446.2

[51] Int. Cl.⁶ .................................................. A47J 31/00
[52] U.S. Cl. .................................................. 99/305; 99/295
[58] Field of Search .................... 99/295, 306, 305, 99/299, 279, 280, 281, 282, 283, 300, 304; 426/433

[56] References Cited

U.S. PATENT DOCUMENTS

| | | | |
|---|---|---|---|
| 3,442,199 | 5/1969 | McGrail | 99/306 |
| 4,056,050 | 11/1977 | Brown | 99/305 |
| 4,064,795 | 12/1977 | Ackerman | 99/305 |
| 4,147,097 | 4/1979 | Gregg | 99/305 |
| 4,920,871 | 5/1990 | Anson | 99/295 |
| 5,025,714 | 6/1991 | Brewer | 99/295 |
| 5,028,753 | 7/1991 | Shariat | 99/306 |

FOREIGN PATENT DOCUMENTS

| | | |
|---|---|---|
| 8227246.8 | 9/1982 | Germany . |
| 4108631A1 | 3/1991 | Germany . |

*Primary Examiner*—Robert W. Jenkins
*Attorney, Agent, or Firm*—Fish & Richardson

[57] ABSTRACT

In a first embodiment, a beverage brewing machine has a reservoir in which water is heated, which is arranged upstream of a brewing unit and heatable by an electric heating device. At the bottom is an outlet valve which opens only on reaching a given water temperature so that the hot water flows through an outlet pipe downstream of the outlet valve from the reservoir over the upper surface of a product, preferably ground coffee or tea-leaves, contained in a brewing unit, from which it goes to a receptacle as a beverage after extraction of the product. Hot water from the reservoir can also be taken via a pipe along paths other than over the upper surface of the product into the receptacle. The pipe takes a siphon-like path, the vertex of which is far enough above the bottom of the reservoir so that hot water also flows via the pipe to the other path and not only over the upper surface of the product only when a certain level is reached in the reservoir. In a second embodiment, the hot water is conveyed along the other path by a brewing head that has main and secondary chambers.

35 Claims, 2 Drawing Sheets

BEVERAGE BREWING MACHINE

The present invention relates to beverage brewing machines

In such beverage brewing machines, water can be heated by an electric heating device and can discharge out of the supply reservoir through an outlet valve, which assumes its open position only upon attainment of a defined water temperature, into a brewing unit containing a product, preferably ground coffee or tea leaves, from where it is finally, after extraction of the product, conveyed as a brewed beverage into a storing tank. In addition, the beverage brewing machine includes a conduit through which brewing water can propagate from the supply reservoir into the storing tank also along a path other than through the upper surface of the product.

A beverage brewing machine of this type is known, for example, from DE-A-27 14 736, wherein a time-responsive switch is provided for the purpose of influencing the aroma or, respectively, the strength, when tea is prepared, which switch controls a valve time-responsively so that, in the event that a defined quantity of brewing water has flown into the sieve, this path will be closed, and brewing water is conveyed only along another path, that means in this case past the sieve, directly into the storing tank. By predetermining the quantity of the product and the quantity of water used, the desired strength of the brewed beverage can be adjusted, that means the brewing time at which the device is set is specific for a product used and has to be observed precisely, because if the brewing time is chosen to be too short, the beverage will not have the proper aroma, while it has a bitter taste if the brewing time was too long.

Further, EP-0 079 235 B1 discloses a coffee machine, wherein the brewing action is performed by cold water flowing from a supply reservoir into a continuous flow heater, where it is heated. The resulting brewing water is conveyed through a feed pipe to a brewing tip, from which it exits into a brewing unit containing a product, preferably ground coffee, out of which the so prepared brewed beverage finally discharges into a storing tank. In this coffee machine, too, a valve device is provided which is controllable either manually or by electronic components so that after a predeterminable brewing time, during which the brewing water is allowed to propagate only through the upper surface of the ground coffee into the storing tank, the brewing water discharges into the storing tank also along another path, a so-called bypass channel.

The reason for deviating the brewing water upon expiry of a determined brewing time is to take positive effect on the taste of the brewed beverage. Thus, it is known above all from the preparation of coffee that a too long contact time between brewing water and ground coffee will extract undesired essential oils, bitter substances, etc. from the ground coffee. Apart from impairing the taste, these mentioned substances are aggressive to the stomach and, further, are to be blamed that the coffee, when it cools in a cup or is kept on a warming plate for too long, will practically be 'upset' in its taste, that means a chemical reaction is caused which even shows in the coffee becoming muddy. Because of the context between contact time and the extraction of undesirable substances from the ground coffee, the problems described will be increased even more, the more cups of the brewed beverage are prepared by the brewing water taking its course along the upper surface of the product. Both known beverage brewing machines counteract the described extraction of substances by having further brewing water propagate along another path into the storing tank after expiry of a defined brewing time which is equal to the contact time of brewing water and product. This way, substantially less undesirable substances are dissolved out of the product. Of course, the quantity of the product must be adjusted in relation to the mentioned quantity of brewing water by taking into consideration the personal taste of the user of the beverage brewing machine.

It is the shortcoming of both beverage brewing machines mentioned hereinabove that they include complicated valve devices, either operated manually or electronically, which are comparatively costly and intricate. In addition, both beverage brewing machines include movable parts which may get jammed due to contamination, or may fail to function for any other reasons.

A beverage brewing machine of the prior-art type is known from U.S. Pat. No. 4,056,050 which is provided with an upwardly open distribution device which can be mounted on its brewing unit and from which brewing water propagates into the storing tank both through the upper surface of the product and along another path. The distribution device is substantially composed of a main and a secondary chamber, and the entire brewing water which is conveyed from the continuous flow heater through the feed pipe enters through the main chamber and is dispensed onto the product after having overcome a valve device controlling the flow passage. Likewise, the brewing water can flow out of the main chamber into the secondary chamber after having surmounted a wall. Brewing water which discharges out of the main chamber meets the product, while brewing water which discharges from the secondary chamber flows off directly into the storing tank without getting into contact with the product. Owing to the open construction of the distribution device and due to the flow of the brewing water being slowed down as a result of the construction of the valve device, the brewing water cools considerably already prior to getting into contact with the product. On the one hand, this cooling results in a reduced use of the ground coffee and, on the other hand, in a reduced quality of the brewed beverage as far as taste and aroma are concerned.

Therefore, the object of the present invention is to provide a beverage brewing machine in which, when preparing larger quantities of a brewed beverage, the time of contact of brewing water and product does not become longer as the quantity of the brewed beverage grows, the need for complicated and movable valve devices being obviated, and without the brewing water cooling in a way detrimental to the aroma.

This object is achieved in a beverage brewing machine in that the conduit takes a siphon-like course, in that the vertex of the conduit is disposed so far above the bottom of the supply reservoir that only starting with a defined filling level in the supply reservoir, brewing water discharges also through the conduit and not only through the outlet pipe. If only so large an amount of water is introduced into the supply reservoir heated by an electric heating device that the vertex of the conduit is not reached at all, the total quantity of heated Water flows directly onto the ground coffee in the filter unit. It has shown in practical operations that the optimal vertex of the conduit corresponds approximately to a number of three cups. Once the brewing water stands above the vertex of the conduit, a certain portion flows off when the outlet valve is open. It does not flow through the upper surface of the ground coffee into the filter unit, but it is conveyed into the storing tank along the other path, that is a pipe acting as a bypass.

The size of the brewing water portion which flows through the bypass into the storing tank depends on the opening cross-section of the siphon-like conduit. Likewise, the quantity which flows directly into the filter unit through the outlet pipe can be determined by the cross-section of the outlet pipe. By properly choosing the cross-section of the outlet pipe, the siphon cross-section and the maximum vertex of the conduit, for instance, a coffee machine can be provided which permits always to make an optimal coffee beverage, be it for a small or a large number of cups. The coffee beverage has a good aroma and a proper colour but only few bitter constituents, and the ground coffee is also used substantially.

To always obtain from beverage brewing machines of various capacities an aromatic but not bitter coffee, it is favourable that the opening cross-sections of outlet pipe and conduit be larger in a beverage brewing machine which can make 12 cups of coffee maximally, for example, than in a beverage brewing machine which can make only 6 cups maximally. Of course, the level of the vertex of the conduit has to be adjusted to the capacity of the beverage brewing machine in the same manner.

It is also achieved by the conduit that if, for example, 12 cups of coffee are to be prepared, only part of the 12 cups of water will pass directly through the ground coffee, while a certain portion of brewing water flows through the conduit past the filter unit into the brewing unit. From this results the advantage that the filter unit and, thus, a paper filter inserted therein can be reduced in size compared to conventional coffee machines, since the head of water in the paper filter is less due to the reduced passage of water through the ground coffee. In addition, this shortens considerably the drip-empty time of the filter.

In order to be able to influence manually the taste and strength in a coffee machine in which 12 cups can be prepared, yet on an average only six cups are made in the most frequent cases, it is favourable according to a further development of the invention that the siphon-like conduit is made of flexible material and is dimensioned sufficiently long so that the vertex of the conduit in respect of the bottom of the supply reservoir can be adjusted to various levels by the user of the beverage brewing machine. Consequently, the user can achieve to vary the taste of the coffee in a simple fashion by the level-adjustable arrangement of the conduit. If, for instance, the vertex of the conduit is close to the bottom, brewing water will be introduced already after a very short time through the conduit into the storing tank so that a strong, but not in the least bitter, coffee can be prepared. If, on the other hand, the vertex of the conduit is farther away from the bottom of the supply reservoir, the ground coffee, in total, is exposed longer to the brewing water, while now as before more tasty than bitter substances are extracted. Consequently, the higher the vertex of the conduit is arranged, the more bitter the coffee becomes with a given quantity of coffee.

It is particularly advantageous that water flows through the conduit only starting with approximately 20% to 40% of the maximally admissible quantity of water in the supply reservoir. It is safeguarded by this arrangement that, when a small quantity of coffee is prepared, for example three cups, the entire brewing water will flow through the brewing unit so that the siphon-like conduit will not be activated at all in such a brewing action. Thus, the coffee almost is not diluted and, therefore, has high concentrate values which exceed, or are equal to, 1.25 percentage by weight. With a brew for eight cups and 6.5 g ground coffee per cup of coffee, the coffee is considered to be strong starting from approximately 1.25 percentage by weight concentrate. Therefore, it is appropriate for a brew of four and more cups to branch off part of the brewing water through the conduit in order to wet the ground coffee by hot water exactly so long that bitter constituents are not yet dissolved from the ground coffee.

Particularly good coffee results are obtained when the opening cross-section of the siphon-like conduit compared to the total opening cross-section of conduit and outlet pipe approximately ranges between 35% and 50%, preferably amounts to 45%. Thus, the opening cross-section of the siphon-like conduit is slightly smaller than the opening cross-section of the outlet pipe, but this is also absolutely necessary when the capacity of the beverage brewing machine is more than six cups approximately. This necessity results from the following: since the siphon-like conduit, once it was activated, acts so long until the entire supply reservoir is emptied, a too large opening cross-section of the siphon-like conduit would permit too much brewing water to be dispensed into the storing tank so that a correspondingly small amount of brewing water would get into direct contact with the ground coffee. The result would be coffee which is too thin. The ratio of opening crosssections indicated in the further development of the present invention, eventually, represents a mean value so that good coffee of a roughly equal quality without appreciable bitter constituents can-be made when one cup of coffee up to twelve cups of coffee is/are prepared.

In order to be able to individually adjust the coffee's quality and its taste as desired by the operator of the machine, in still another further development of the present invention the conduit is provided with a valve device governing the passage of the brewing water, but ensuring a minimum passage. Such a valve device is advisable in particular when a coffee machine is used which exhibits wide limits from the minimum to the maximum number of cups. In this case, the valve device can be adjusted to a defined number of cups in such a way that the taste of the coffee for the coffee consumer is almost always in the optimum range. The minimum flow passage of the valve device should be set to an average number of cups so that, if more cups are required exceptionally, an increase of the opening cross-section is possible by activating the valve device, the passage of brewing water through the ground coffee being reduced as a result.

It is particularly favourable that the valve device can be adjusted by the user of the beverage brewing machine within limits so that, at a sufficient filling level, 10% to 40% of the brewing water can discharge through the siphon-like conduit after the outlet valve is opened.

To ensure that the brewing water which discharges through the conduit into the storing tank reaches the storing tank in a sufficiently hot condition, it is favourable that the conduit extends through the supply reservoir. It is achieved by this arrangement that as long as water is heated in the supply reservoir, the brewing water which flows through the conduit reaches the storing tank at a higher temperature than the brewing water which flows through the ground coffee.

It is proposed in a second embodiment of the present invention that the brewing tip in a beverage brewing machine provided with a continuous flow heater includes a main chamber and a secondary chamber which have each at least one outlet opening for the brewing water, the first outlet opening conveying the brewing water directly to the upper surface of the product, while the second outlet opening conveys brewing water along the other path into the storing tank, that the feed pipe ends into the main chamber, that a partition wall is arranged between the main chamber and the secondary chamber which accumulates the brewing water being conveyed through the continuous flow heater into the main chamber for so long until the latter's level exceeds the upper edge of the partition wall, whereupon the supplied brewing water discharges also through the secondary chamber and, hence, along the other path into the storing tank.

Alike the siphon-like conduit in the first embodiment, it is the purpose of the secondary chamber to ensure that only when the level of brewing water in the main chamber has risen as a result of the constant inflow of brewing water out of the continuous flow heater up to the upper edge of the partition wall due to the reduced discharge, overflowing into the secondary chamber takes place and, thus, brewing water flows out of the second outlet opening into the storing tank as well, and flows no more exclusively along the upper surface of the ground coffee. In this case, too, it can be determined by the quantity of water which the two chambers permit to store, by the feed performance of the continuous flow heater and by the proper dimensioning of the cross-sectional sizes of the outlet openings how much brewing water flows along the upper surface of the ground coffee and how much brewing water flows along the other path into the storing tank. This way, in turn, the taste of the coffee can be adjusted rather precisely, more particularly as regards the share of the bitter constituents in it. Neither this embodiment necessitates complicated or movable valve devices, there is need for only one brewing tip subdivided into a main chamber and a secondary chamber and having a partition wall and precisely defined cross-sections of the outlet openings. By choosing the height of the partition wall it can be achieved that, only after approximately the quantity of one cup up to three cups of water is conveyed, a certain portion of brewing water may flow over into the secondary chamber.

In order that the steam generation which is caused in the continuous flow heaters of the prior-art type when hot water is conveyed does not develop an excess pressure in the main and the secondary chambers which would have as a result that an increased quantity of water is dispensed out of the outlet opening, it is suggested by the invention that the brewing tip is in constant communication with the atmosphere irrespective of the brewing water level. Hence, the steam which is generally produced with a snoring noise may escape to the atmosphere so that both the main chamber and the secondary chamber always remain pressureless during the operation of the coffee machine.

According to the present invention, the connection of the brewing tip with the atmosphere is established by a pipe which penetrates the bottom of the brewing tip and the free end of which is disposed above the upper edge of the partition wall. It is thereby accomplished that brewing water is not dispensed through the pipe but exclusively through the two outlet openings of the brewing tip.

To prevent hot steam from escaping unusedly through the pipe, the pipe is arranged in the main chamber close to the first outlet opening according to the invention. When hot steam exits from the pipe, the ground coffee which is disposed beneath the first outlet opening is warmed up by the steam so that it is preheated, and the brewed beverage also becomes hotter in general. Expediently, the cross-section of the pipe is between 15 mm$^2$ and 30 mm$^2$. When the cross-section is smaller, the product overheats due to an excessive steam flow; when the cross-section is larger, the penetration of the product by hot steam is insufficient. A pipe diameter of about 5 mm has proved to be expedient in conventional continuous flow heaters in the range of 900 to 1250 watts. The product is protected, and bitter constituents are scarcely released. With this dimensioning and when preparing eight cups of coffee with a quantity of coffee of approximately 50 g, a final temperature in the product between 87° C. and 93° C. results which is obtained by the infusion of hot water plus the separate application of steam.

A good compromise between a sufficient use of the ground coffee and the share in bitter constituents is obtained when the surface of the second outlet opening is smaller than the surface of the first outlet opening.

As far as the taste and the concentration of the brewed beverage over the quantity range of one cup up to twelve cups is concerned, it has proven particularly practicable that the dimensioning of first and second outlet opening is chosen such that after the first overflow of brewing water out of the main chamber into the secondary chamber only about 10% to 40% of the brewing water which is then conveyed by the continuous flow heater will discharge through the second outlet opening.

The end of the conduit or the second outlet opening being directed to the edge of the brewing unit and a channel being provided at the edge which forms the other path for the brewing water obviates the need for a separate conveyance of the brewing water to the storing tank which would require additional components. Beside aesthetic advantages, cost reduction is achieved as well.

The fact that the channel is formed by the outside of the filter insert and by the inner edge of the brewing unit in case that a water-permeable filter is inserted into the brewing unit, with the width of the channel being determined by spacer elements and being sized such that the product is wetted laterally by the brewing water, it is accomplished that the brewing water which reaches the storing tank along the other path gets into contact with the lateral fringe areas of the product. In particular as far as coffee is concerned, the advantage is that this fringe area, too, is better extracted by brewing water, since the brewing water which exits from the first outlet opening will hardly reach the fringe area of the ground coffee. Almost no undesirable products are dissolved out of the ground coffee, since the fringe area has hardly been in contact with brewing water before, on the one hand, and since the contact time between brewing water and ground coffee is shortened anyway owing to the inventive brewing tip, on the other hand. It has shown in practical tests that the so-called concentrate in the brewed beverage (which dictates the coffee's strength) can be augmented by 10 to 15% in this improvement of the brewing tip according to the present invention. This effect is even enhanced by the fact that, with filter inserts made of paper, also the concentrate which collects there when brewing water is only delivered out of the first outlet opening is floated and, therefore, does not remain unused.

All the features mentioned before gain particular significance when the contact surface between the brewing water, which exits from the second outlet opening and the fringe areas of the ground coffee, is increased considerably by the channel extending over wide ranges or entirely along the periphery of the brewing unit.

In order to obtain a certain funnel effect when the brewing water is introduced out of the second outlet opening into the channel, the channel is provided with a collecting groove on its inlet side, which is opposite to the free end of the conduit or the second outlet opening. The collecting groove may also extend entirely or partly along the periphery of the filter unit in order to take up brewing water which ejects intermittently out of the second outlet opening. Owing to the channel terminating into the outlet opening of the brewing unit on the outlet side, one single outlet on the brewing unit results, which simplifies the construction of the storing tank, since only one single inlet must be provided, and, in addition, heat losses of the brewed beverage are kept within limits.

In order to be able to make good coffee in a coffee machine also in practice, it is favourable that the continuous flow heater delivers a quantity of 4 to 6 milliliters per second, that the total surface of main chamber and secondary chamber ranges between 20 cm$^2$ and 40 cm$^2$, that the ratio of the surfaces of main chamber and secondary chamber is in the order of 4:1 to 8:1, that the height of the partition wall is in the range of 6 mm to 12 mm, that the surface of the first outlet opening ranges between 7 mm$^2$ and 14 mm$^2$ and that the surface of the second outlet opening ranges between 4 mm$^2$ and 13 mm$^2$. Optimal coffee results are accomplished when the continuous flow heater supplies a quantity of 4.5 milliliters per second at an electric output of 1250 watts, when the total surface of main chamber and secondary chamber approximately amounts to 30 cm$^2$ when the surface of the main chamber approximately amounts to 25 cm$^2$ and the surface of the secondary chamber approximately amounts to 4.5 cm$^2$, when the height of the partition wall is 8 mm, the surface of the first outlet opening roughly amounts to 11 mm$^2$, and the surface of the second outlet opening approximately amounts to 8 mm$^2$. To prevent the water which flows into the secondary chamber from exiting too fast out of the second outlet opening, both the surface of the second outlet opening and the volume of the secondary chamber are less than the surface of the first outlet opening and the volume of the associated main chamber. As a result, the quantity of water accumulating in the second chamber, that means the quantity of brewing water which flows through the channel—the so-called bypass quantity —, can be determined. Relatively high concentrate values are reached in spite of small bypass portions; the losses in concentrate are insignificant (approximately 2.5%), the bitter constituents are negligible. The bypass portions can be varied by changing the volume portions of main chamber and secondary chamber as well as their outlet openings.

Another favourable embodiment of the present invention is that at least one baffle is placed in the main chamber, each containing at least one aperture which lies in about at the level of the bottom of the brewing tip. It is thereby achieved that brewing water which is conveyed intermittently from the continuous flow heater into the brewing tip passes over from the main chamber into the secondary chamber only when the mean brewing water level in the main chamber surmounts the upper edge of the partition wall.

In that embodiment, a valve is provided in the brewing tip which permits to control the discharge quantity of the brewing water along the other path. Thus, it is up to the user of the beverage brewing machine to make a brewed beverage with more bitter constituents or with less or almost no bitter constituents. That means the taste of the brewed beverage can be predefined by the user. However, the valve can be closed only to such extent that a portion of brewing water which discharges along the other path at the second outlet opening still amounts to a minimum of 30%, that means the valve cannot be closed entirely.

It is favourable that the valve is provided at the second outlet opening so that it's cross-section can be changed. The arrangement of the valve at the second outlet opening permits a particularly simple design of the valve and ease of mounting it.

To obtain a valve which functions properly in a long useful life, it is suggested in a further improvement upon the present invention that the valve is composed of a valve seat provided in the housing of the brewing tip and cooperating with a valve piston which can sealingly close the valve seat, and that both the valve piston and the valve seat are furnished with an aperture each, which apertures determine the opening cross-section of the valve depending on the degree they overlap each other. The operation of such a slit-type valve is especially fail-safe and can be controlled at a small angle of rotation already from a minimum position (30% opening cross-section) to its maximum position (100% opening cross-section).

In order that the valve can be easily rotated even after a long time of operation and, nevertheless, does not become leaky when exposed to the given great variations in temperature, it is suggested in another improvement upon the present invention that the valve seat is formed by a bore in which a cylindrical portion of the valve piston is sealedly guided, that both the bore and the cylindrical portion are provided with an aperture each, and that on rotation of the valve piston about its longitudinal axis the aperture of the valve piston will move into alignment with the aperture of the valve seat. Thus, the valve is formed by a slide valve with a valve piston rotating in the sealing seat. Such valves with a sliding fit can be manufactured in particular without complicated seals and additional sealing elements. More particularly, valves made from a not too soft plastic material or ceramics have proven expedient.

If it is desired that the actuating element be arranged at an easily accessible location on the beverage brewing machine, on the one hand, and the valve itself be arranged at another location on the beverage brewing machine which permits ease of integration, on the other hand, it is proposed in another improvement upon the present invention that the actuating element is rotatable about an axis of rotation shifted in parallel to the longitudinal axis, and that the transmission of the rotation of the actuating element to the valve piston is effected by a slide which eccentrically engages the former. Owing to this arrangement, the actuating element can be arranged separately from the valve in the beverage brewing machine, and it can be operated mechanically nevertheless.

A particularly simple lever gearing can be obtained in that the slide contains a first and a second opening, a first pin provided outside the longitudinal axis on the valve piston engaging into its first opening, and a second pin provided outside the axis of rotation on the actuating element engaging into its second opening. Owing to the pins which engage into the openings after the assembly, a simple and quick coupling of the slide with the actuating element and with the valve piston is accomplished. Due to the eccentric arrangement of the pins on the actuating element and on the valve piston, the rotary movement introduced at the actuating element is converted into a straight-lined movement on the slide which, subsequently, is converted into a rotary movement on the valve piston again in order to control the valve. A lever gearing of this type affords ease of manufacture and, besides, permits the local separation of the actuating element from the valve piston in the beverage brewing machine.

Since the valve governs the discharge of the brewing water out of the secondary chamber through the second outlet opening, it is appropriate to guide the slide in the secondary chamber. As a result, the guiding devices for the slide can be shaped directly at the secondary chamber which exists anyway. The slide must be arranged in the secondary chamber such that, substantially, it does not get into contact with the exiting brewing water in order to avoid additional seals between the conduit or, respectively, the secondary chamber and the slide. Especially simple parts result when the brewing tip is made of plastics.

A valve device which exhibits a particularly clear lay-out and affords ease of operation is accomplished when the actuating element is guided at the edge of the supply reservoir of the beverage brewing machine and, in addition, the supply reservoir extends substantially up to the upper edge of the beverage brewing machine. It is favourable that the supply reservoir can be closed by a cover which covers the actuating element towards the outside. However, it is also possible in another embodiment that the supply reservoir is closable by a cover and that the cover contains an opening through which the actuating element can be operated from the outside. This design allows an operator a clear view and rapid access to the actuating element without having to open the cover of the supply reservoir.

Two embodiments of the present invention are illustrated in the drawings and will be described hereinbelow in more detail.

Figure 1:
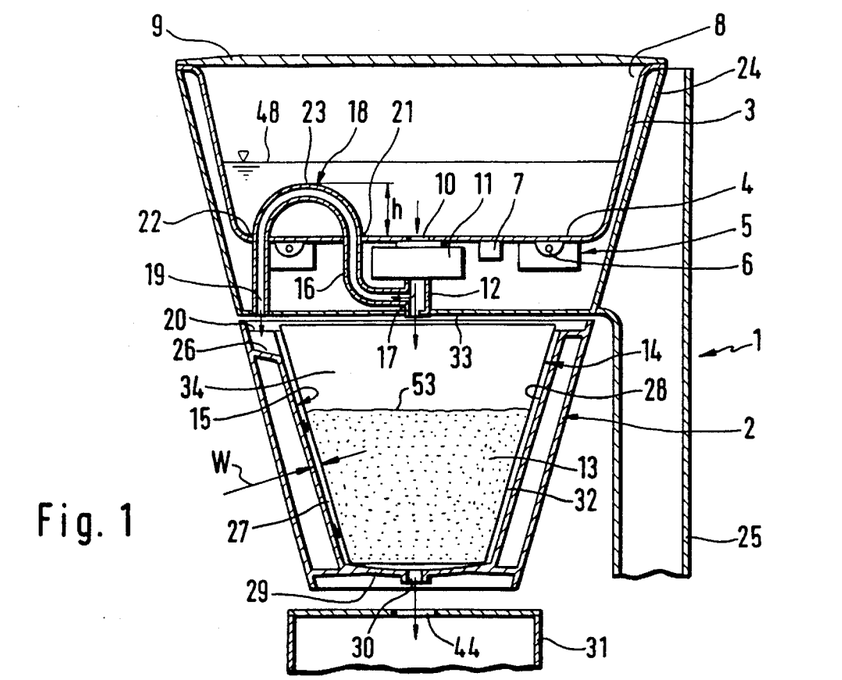
FIG. 1 is a longitudinal cross-sectional view of a first embodiment according to the present invention, the other path for the brewing water being formed by a conduit with a siphon-like course, and showing only the supply reservoir with the coffee filter of a beverage brewing machine arranged therebeneath.

In FIG. 1, a section of a beverage brewing machine 1 is shown which includes above a brewing unit 2, a supply reservoir 3, on the bottom 4 of which an electrically operated heating device 5 is arranged. Thus, the supply reservoir 3 in conjunction with the heating device 5 represents an open boiler in which filled in water can be brought to boil. The heating device 5 is formed by a circularly extending heating spiral 6 which is supplied with electric energy when a switch of the beverage brewing machine is activated, which is not shown in the drawing.

According to FIG. 1, further, a temperature control device 7 controlling the temperature of the water of the supply reservoir 3 is arranged on the bottom 4 outside the supply reservoir 3 which, once the water is heated to a sufficient temperature, interrupts the electric energy supply to the heating spiral 6. The supply reservoir 3 contains a fill opening 8 which is closable by a cover 9.

Also, an opening 10 is provided on the bottom 4 of the supply reservoir 3 according to FIG. 1 which connects to an outlet valve 11 arranged beneath the bottom 4. The outlet valve 11 is formed by a thermostat valve which does not open until the water, when heated, has reached a predetermined temperature, preferably its boiling temperature. An outlet pipe 12 succeeds the outlet valve 11 and, as soon as the outlet valve 11 has assumed its open position, allows the brewing water to be dispensed on the upper surface 53 of a product 13 introduced into the brewing unit 2. Preferably, the product 13 is ground coffee which is filled into the brewing unit 2 only after a water-permeable filter insert 14, preferably a paper filter, has been inserted into the receiving chamber 15 of the brewing unit 2, which chamber tapers conically downwards.

Branching off from the outlet pipe 12 according to FIG. 1 is a conduit 16 which has a siphon-like course 18, that means the conduit 16 extends from its branch point 17 provided beneath the bottom 4 once more into the chamber of the supply reservoir 3, from where it returns to the bottom 4 due to its siphon-like course 18, interrupts said bottom and, with its free end 19, is directed to the upper edge 20 of the brewing unit 2. At those points where the conduit 16 penetrates the bottom 4, of course the conduit 16 must be shut off tightly against the openings 21, 22 provided on the bottom 4.

According to FIG. 1, the vertex 23 of the siphon-like conduit 16 is at a level h which roughly corresponds to a quantity of water of 20 percent to 40 percent disposed in the supply reservoir 3 of the maximum capacity of water which the supply reservoir 3 can take up. When a flexible conduit 16 and a level-adjusting device not shown in FIG. 1 are used, the vertex 23 can be adjusted to different levels h by the user inasfar as the conduit 16 is sized to be sufficiently long.

According to FIG. 1, the supply reservoir 3 is embedded in a casing or, respectively, a housing 24 which is connected with a base 25. Of course, it is also possible that the siphon-like conduit 16 extends outside the supply reservoir 3 in the same way. If necessary, the free end 19 of the siphon-like conduit 16 can be provided with a valve device controlling the passage of water, which is not illustrated in the drawing though.

Perpendicularly below the free end 19, a collecting groove 26 is shaped at the edge 20 of the brewing unit 2 which collects the brewing water exiting at the free end 19 and conveys it to a channel 27 provided at the edge 20 of the brewing unit 2, from where it is conveyed between filter insert 14 and the wall 28 of the brewing unit 2 until it's bottom 29, where it subsequently exits from the outlet opening 30 together with the brewing water which entered through the upper surface 53 of the product 13. The ready brew is then dispensed through the outlet opening 30 into a storing tank 31 provided beneath the outlet opening 30.

Figure 2:
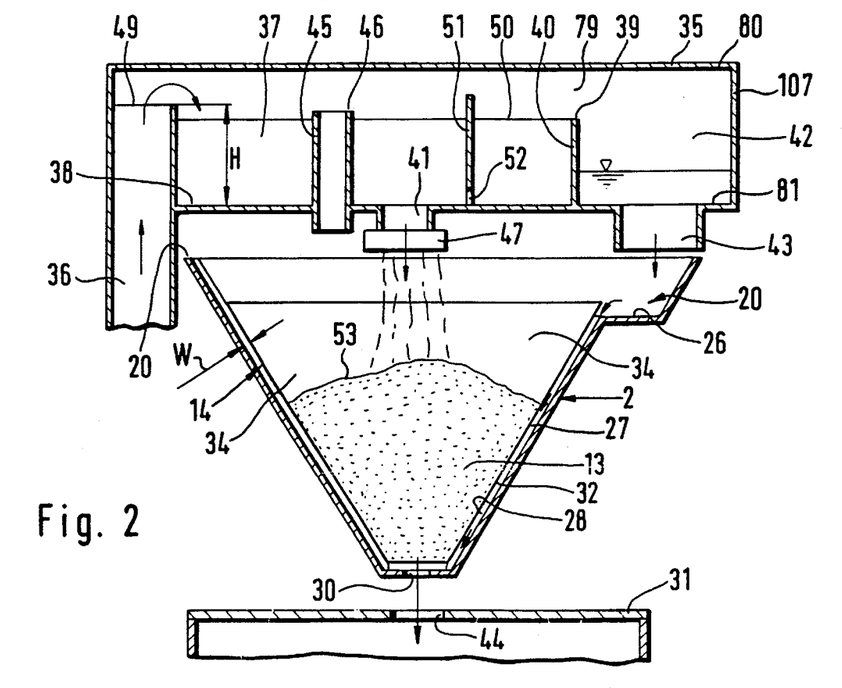
FIG. 2 is a longitudinal cross-sectional view of a second embodiment of the present invention, wherein only the brewing tip containing the other path and the brewing unit of a beverage brewing machine are illustrated schematically.

The collecting groove 26 can be shaped as a locally provided indentation in the edge 20 as is illustrated in FIGS. 1 and 2. However, it can also be provided as an annularly designed groove which extends in part or entirely in the edge's inner circumference of the filter unit 2, which groove, additionally, starting from the inlet, can have a gradient. The channel 27 is formed by the outside surface of the filter insert 14 bearing against ribs 32 which project from the wall 28. The ribs 32 act as spacer elements in particular when a paper filter is used. Thus, the channel 27 is formed by the outside of the filter insert 14 and the inner wall 28 of the brewing unit 2, on the one hand, and by the spacer elements 32 themselves, on the other hand. When a corresponding number of spacer elements 32 is used along the wall 28, a variety of channels 27 can be provided for the brewing water exiting from the end 19 of the conduit 16. When a form-stable filter insert 14, for example a sieve-like metal filter, is used, already few spacer elements 32 are sufficient in order to provide a channel which circulates round the brewing unit 2 and has a precisely defined width W.

The channel 27 includes a collecting groove 26 on its inlet side which takes up brewing water ejecting intermittently out of the conduit 16. In the event that several channels 27 are provided along the circumference of the brewing unit 2, or one single continuous channel 27 exists, the collecting groove 26, too, extends correspondingly along the circumference of the brewing unit 2.

The brewing unit 2 can be secured to the bottom side 33 of the housing or the casing 24, respectively, so as to be removable.

As can be seen in FIG. 1, in this embodiment the upper free end of the paper filter 14 projects slightly beyond the collecting groove 26 in order that, when brewing water flows through the conduit 16, it will not get into the interior 34 of the paper filter 14. However, the paper filter 14 must not project upwardly so far that water which flows on the collecting groove 26 will make the paper filter 14 collapse inwardly.

As far as the brewing unit 2 in FIG. 2 is concerned, it corresponds basically to that one in FIG. 1 so that the one referred to in FIG. 2 need not be dealt with more closely. Therefore, to avoid repetitions, like reference numerals have been assigned to like parts in the brewing unit 2.

FIG. 2 shows only a brewing tip 35 Which is provided on top of the brewing unit 2. Said brewing tip 35 includes a feed pipe 36 which communicates with a continuous flow heater not illustrated in the drawing. In turn, the continuous flow heater communicates with a supply reservoir not shown in the drawing which contains cold water during the brewing action.

Since a coffee machine operating according to this principle has been known for long, as can be gathered from German patent application P 41 08 631.7, the preparation and the transport of brewing water up to the brewing tip 35 will not be referred to in detail herein. Finally, the brewing water is conveyed to the feed pipe 36 at the brewing tip 35.

According to FIG. 2, the feed pipe 36 terminates into a main chamber 37 provided in the brewing tip 35, however, at a level H with respect to the bottom 38 of the main chamber 37 which is above the upper edge 39 of a partition wall 40. The partition wall 40 confines the main chamber 37 in FIG. 2 to the right and is disposed on the right of a first outlet opening 41 which is provided roughly above the middle of the brewing unit 2 so that, when brewing water is dispensed out of the first outlet opening 41, it flows directly on the upper surface 53 of the product 13 disposed therebeneath.

Provided on the right hand of the partition wall 40 in FIG. 2 is a secondary chamber 42, which contains a second outlet opening 43 on the bottom 38 of the brewing tip 35 and which corresponds to the free end 19 of the conduit 16 in FIG. 1. Therefore, also in this case, the brewing water which exits from the second outlet opening 43 flows onto the collecting groove 26 provided in the brewing unit 2, from where it propagates through the channel 27, which like in FIG. 1 is formed of the paper filter 14, the ribs 32 and the wall 28, finally into the outlet opening 30 which is provided at the bottom end of the brewing unit 2, from where it, subsequently, enters through the inlet 44 into the storing tank 31 disposed therebeneath.

According to FIG. 2, a pipe 45 is provided on the left hand of the first outlet opening 41 in the bottom 38, which pipe penetrates the bottom 38 downwardly towards the atmosphere and which projects into the main chamber 37 so far that it ends with its upper edge 46 above the partition wall 40. Pipe 45 serves to vent the main and the secondary chamber 37, 42. Following the first outlet opening 41 is another valve 47, by which the opening cross-section of the first outlet opening 41 can be increased.

The mode of effect of the beverage brewing machines according to FIGS. 1 and 2 is as follows:

When cold water is filled into the supply reservoir 3 of the beverage brewing machine 1 according to FIG. 1, the filling level of which is indicated by the water-depth gauge, it can be noted that the water-depth gauge 48 is above the vertex 23 of the siphon-like extending conduit 16. As soon as the main switch (not shown) of the beverage brewing machine 1 is actuated, the heating device 5 becomes operative since the temperature control device 7 is short-circuited. Now the water in the supply reservoir 3 is heated until it starts to boil, or, respectively, until the desired temperature is reached. Beginning from this point, the temperature control device 7 interrupts the power supply to the heating spiral 6. Simultaneously, the outlet valve 11 opens, and brewing water discharges via the outlet pipe 12 onto the upper surface 53 of the product 13 into the brewing unit 2.

Since the water-depth gauge 48 of the brewing water is above the vertex 23 of the conduit 16, brewing water is also dispensed through the conduit 16 and the free end 19 into the collecting groove 26 of the brewing unit 2. When the crosssections of outlet pipe 12 and conduit 16 have been chosen correspondingly, it is ensured that a sufficient amount of pressure prevails at the inlet of the conduit 16 in order that brewing water can flow through the conduit 16.

The branch point 17 of the conduit 16 can also be connected directly on the bottom 4 of the supply reservoir 3 with a temperature-controlled valve of its own (not illustrated) so that the discharge of brewing water, which otherwise is effected through the conduit 16, can be effected through an own connection at the supply reservoir 3, instead of by way of the valve 11.

The quantity of brewing water which gets into contact with the upper surface 53 of the product 13 extracts the extraction materials, for example from coffee, and then flows at the outlet opening 30 through the inlet 44 into the storing tank 31. Simultaneously, however, brewing water flows through the channel 27 provided as a bypass to the outlet opening 30. This portion of brewing water which, in the event of a waterpermeable filter insert 14, gets into contact with the ground coffee 13 from said's lateral surface leads to effectively extract the ground coffee in this area which, in the event that brewing water is supplied solely through the upper surface 53, will not result to this degree. Owing thereto, one can do with a reduced quantity of ground coffee 13 when making coffee of a desired strength. Practically, there is hardly any extraction of undesirable flavour materials, since the contact times between the ground coffee 13 and the brewing water are reduced due to the channel 27 acting as a bypass.

This is because due to the separate discharge of the brewing water out of the supply reservoir 3, a smaller portion of brewing water is introduced through the upper surface 53 of the product 13 than would be in case the conduit 16 did not exist. As a result, brewing water is applied to the product 13 for a shorter period of time so that bitter constituents and other products impairing the brew are not extracted. The brewing water penetrating the channel 27 extracts the product 13 in the upper fringe area of the paper filter and also flows through the outlet opening 30 out of the brewing unit 2 and, in doing so, mixes with the extracting brew.

The higher the water-depth gauge 48 in FIG. 1 is, the greater portions of brewing water pass through the conduit 16 and the channel 27. This portion of brewing water can amount to 10 to 40 percent approximately, depending on which water-depth gauge 48 prevails in the supply reservoir 3.

If the water-depth gauge 48 in FIG. 1 is below the vertex 23, no brewing water at all flows through the conduit 16, that means the entire brewing water must pass the product 13 through said's upper surface 53. However, since in this case the extraction time, that means the time during which the product 13 is in contact with the brewing water, is still relatively short, undesirable materials are extracted from the product 13 only to a limited extent.

When the filter insert 14 is not water-permeable in the lateral areas of the ground coffee 13, admittedly, no extraction effect is accomplished with the portion of brewing water which flows through the channel 27, but it still remains that the contact time between the brewing water and the ground coffee, favourably, is shortened due to the bypass effect of the channel 27 in connection with the conduit 16.

When the main switch of the beverage brewing machine 1 is actuated in FIG. 2, water is heated in the continuous flow heater not illustrated in FIG. 2 and, due to the effect of the resultant formation of steam bubbles, is pumped upwardly in the feed pipe 36 until brewing water enters over the edge 49 of the feed pipe 36 into the main chamber 37. As is generally known, a continuous flow heater delivers brewing water in conformity with its heating power and the cross-section of its heated pipe in more or less rapid intervals so that brewing water spills abruptly over the upper edge 49. In the absence of a valve 47, a quantity of brewing water corresponding to the cross-section provided at the first outlet opening 41 flows out of the first outlet opening 41 onto the upper surface 53 of the product 13 disposed underneath.

However, since the cross-section of the first outlet opening 41 is dimensioned such that less brewing water is dispensed than is introduced through the feed pipe 36, the main chamber 37 fills slowly with brewing water until a brewing water level 50 is reached which corresponds to the upper edge 39 of the partition wall 40. Subsequently, brewing water enters also over the upper edge 39 of the partition wall 40 into the secondary chamber 42, from where it propagates through the second outlet opening 43 into the collecting groove 26 of the brewing unit 2, and from there it flows along the channel 27 to the outlet opening 30, where it is mixed with the brew and is dispensed into the storing tank 31 placed underneath. It has already been explained hereinabove in the description of FIG. 1 how the channel 27 causes further extraction of the ground coffee so that there is no need to describe it once more at this point.

Due to the substantial formation of steam during the delivery of the brewing water through the feed pipe 36, an excess pressure would be caused in the closed brewing tip, thus in the main and secondary chambers 37, 42, unless the pipe 36 was provided in the main chamber 37 which terminates only above the water level 50, which extends through the bottom 38 and is connected to the atmosphere there. This prevents the occurrence of a pressure increase in the main and secondary chambers 37, 42, since pressure impacts are dispensed at once through the pipe 45 to the atmosphere, an even discharge of brewing water out of the outlet openings 41, 43 being accomplished in dependence on the water level. Advantageously, the exit of hot steam at the pipe 35 is still used to heat the product 13 and the brewing unit 2 within certain limits so that heat losses occurring when the brewing water passes through the product 13 are compensated in part and, thus, sufficiently hot coffee reaches the storing tank 31.

As can still be seen in FIG. 2, a baffle 51 rises from the bottom 38 and is provided with at least one aperture 52. The apertures 52 serve that a uniformly high water level 50 adjusts on the left and the right hand side of the baffle 51 in the main chamber 37. The purpose of the baffle 51 itself is to catch brewing water which is injected at the upper edge 49 of the feed pipe 36 and to convey it into the main chamber 37 in order to always ensure that brewing water flows into the secondary chamber 42 only when the brewing water level 50 is indeed at the level of the upper edge 39 of the partition wall 40.

Instead of the continuous flow heater not illustrated in FIG. 2, also the supply reservoir 3 together with valve 11 illustrated in FIG. 1 could be used for heating the brewing water, from which reservoir the entire brewing water could be supplied to the main chamber 37 after opening of the valve 11. In this case the dimensions of the two outlet openings 41, 43 and the size of the main and secondary chambers 37, 42 would have to be adapted to the suddenly starting continuous supply of brewing water.

Figure 3:
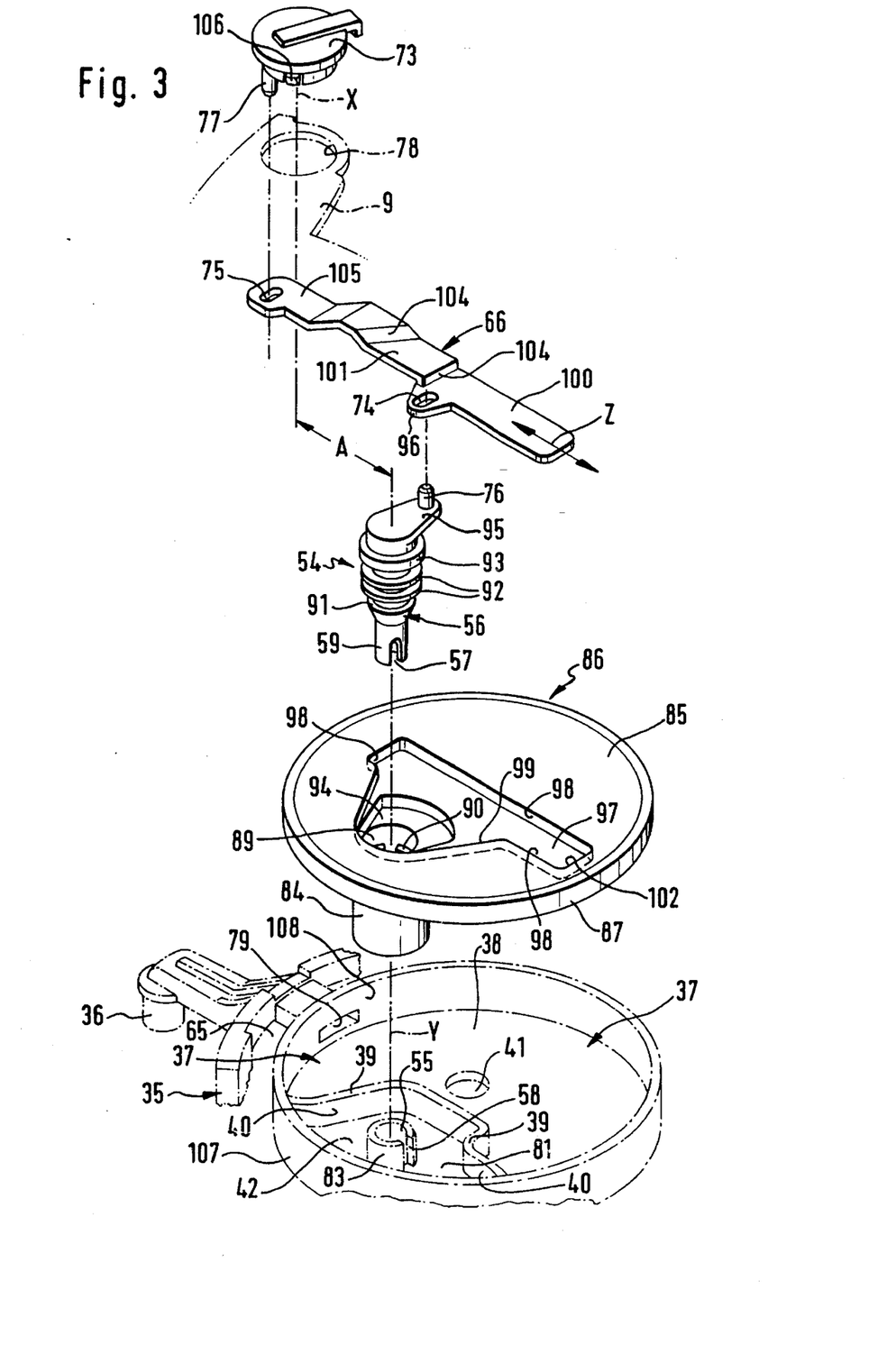
FIG. 3 is a so-called exploded view of a valve assembly fitted into the brewing tip according to FIG. 2.

In the bottom part in FIG. 3, the brewing tip 35 described in FIG. 2 is illustrated partly in dash-dotted lines, into which, through the pipe 36, the hot brewing water enters from the continuous flow heater not shown in the drawing through the inlet opening 79 into the main chamber 37. The main chamber 37 is surrounded by a circumferential wall 107. Extending from the bottom 38 of the main chamber 37 upwardly is a partition wall 40 which, in conjunction with the bottom 81, forms the secondary chamber 42 and which is bounded by the main chamber 37 up to the upper edge 39. The main chamber 37 includes the inlet opening 79, rectangular in its cross-section, which is offset in height with respect to the bottom 38 of the main chamber 37. The main chamber 37 contains in its bottom 38 an opening 41 which conveys the brewing water directly to the upper surface 53 of the product 13 according to FIG. 2. The inlet opening 79 is arranged in the circumferential partition wall 107 of the brewing tip 35.

As can be seen from FIG. 3 in addition, the secondary chamber 42 includes on its bottom 81 a tubularly designed valve seat 55 which reaches concentrically to the vertically extending longitudinal axis Y and which contains an aperture 58 in its wall 83. Succeeding the valve seat 55 downwardly is the outlet opening 43 shown in FIG. 2. The external wall of the tubular valve seat 55 is provided with a cylindrically extending peripheral surface 83 which is overlapped by a tubular socket 84. The tubular socket 84 is disposed on the bottom side of a cover 86 designed like a shell. This cover 86 engages with a collar 87 into the inner edge 108 of the wall 107 and is in sealing abutment thereon. This accomplishes closure of main chamber 37 and secondary chamber 42 which affords ease of mounting. The bottom 85 of the cover 86 is placed so far above the inlet opening 79 and the partition wall 40 that the brewing water is not inhibited to flow into the main chamber 37 and, over the upper edge 39 of the partition wall 40, into the secondary chamber 42. The cover 86 limits the main and secondary chambers 37, 42 so as to seal them towards the top.

The socket 84 in FIG. 3 is provided with a bore 89, into which the valve piston 56 is inserted and engages with its cylindrically extending portion 59 into the cylindrically formed valve seat 55 when the valve piston 56 is fitted into the bore 89. Provided on the portion 59 of the valve piston 56 is an aperture 57, which is formed corresponding to the aperture 58 from the top to the bottom, that is in parallel to the longitudinal axis Y, and which, in the event that both apertures 57, 58 are in alignment with each other in part or in full (not shown), releases the brewing water which entered the secondary chamber 42 to the exit so that this brewing water is allowed to discharge into the brewing unit 2 through the second outlet opening 43 which succeeds the valve seat 55 (FIGS. 2 and 3).

According to FIG. 3, knubs 90 which are evenly distributed along the circumference of the bore 89 and are on the same level rise from the bore 89 concentrically to the longitudinal axis Y. These knubs 90 serve to axially secure the valve piston 56 in the bore 89 or, respectively, on the valve seat 55 after the valve piston 56 has been inserted into the bore 89. In this case, the knubs 90 engage the collar 91 provided on the valve piston 56 from behind so that the valve piston 56 is not permitted to turn upwardly out of the bore 89, not even in the event of a repeated rotation upon operation of the valve 54. Above the collar 91, rings 92 are provided which are dimensioned in respect of the internal diameter of the bore 89 such that a seal joint is additionally formed at this location. Also, the external diameters of the outside peripheral surfaces of the rings 92 are sized such that they abut with a small preload on the wall of the bore 89 so that an automatic rotation of the valve piston 56 due to vibrations acting upon the beverage brewing machine 1 is prevented.

At its upper end, the valve piston 56 in FIG. 3 is furnished with a ring 93 which, when the valve piston 56 is mounted in the bore 89, serves as a stop at the end surface 94 confining the bore 89 to the top. Succeeding the annular collar 93 upwards in FIG. 3 is a lever 95, which is shaped at the valve piston 56 and at the top end surface of which an upwardly directed first pin 76 is formed. With the valve 54 mounted, the first pin 76 engages into a first opening 74 which is provided above the valve piston 56 at a slide 66, the said opening being formed at a projection 96 shaped laterally at the slide 66.

With the valve 54 mounted in the brewing tip 35, the slide 66 with its portion 100 lies flatly in a recess 97 provided in the bottom 85 of the cover 86, the individual lateral wall portions 98 of the recess serving as a lateral boundary for the slide 66 so that the former is displaceable only in its displacing direction Z. The slide 66 is retained upwardly by the lower side of the upper cover (not illustrated) of the beverage brewing machine 1 in the recess 97. The bottom portion of the lateral wall 98 includes an extension 99, owing to which a sufficient play is ensured for both the lever 95 and the projection 96 when the slide 66 is displaced in its displacing direction Z. Following the front area 100 are steps 104 which serve that the slide 66 can be guided along the collar 87 outwardly to the second pin 77 of the actuating element 73. The step 102 serves as a stop for the slide 66 in the direction Z. A second opening 75 is provided in the front portion 105 of the slide 66 into which the second pin 77 engages in the mounted condition of the valve 54. The second pin 77 is arranged eccentrically on the actuating element 73 which, substantially, is of circular design, and which, in the mounted condition, is encompassed by a bore 78 formed in the cover 9 of a supply reservoir (not shown) of a beverage brewing machine 1. The actuating element 73 comprises on its circumference locking elements 106, which are engaged from behind into a (non-illustrated) bore incorporated in the supply reservoir and thereby rotatably mount the actuating element 73 at the supply reservoir. As can be seen in FIG. 3, the axis of rotation X has a distance A from the longitudinal axis Y which corresponds to the distance between the valve piston 56 and the actuating element 73. Due to the two pins 76, 77 having the same distance from the elongated openings 74, 75, it is possible to actuate the valve 54 by way of the slide 66. Thus, the position of the actuating element 73 can be determined under functional and creative points of view irrespective of the predefined position of the opening 43 (FIG. 2).

The mode of effect of the valve according to the present invention as in FIG. 3 in connection with the beverage brewing machine of FIG. 2 is as follows:

When the valve 54 is closed, the slots 57, 58 overlap each other but slightly, that means the slot 57 is sealingly closed in the essential area by the valve seat 55 in such a way that only approximately 30% of the maximum opening cross-section are open. Admittedly, this position allows brewing water to flow over the upper edge 39 of the partition wall 40 into the secondary chamber 42 once the main chamber is filled with brewing water. However, discharge of the brewing water through the valve 54 to the free end 19 of the conduit 16 (FIG. 1) or, respectively, to the second outlet opening 43 (FIG. 2) takes place in a small quantity only. This way, the major portion of brewing water flows through the first outlet opening 41 onto the upper surface 53 of the product 13 according to FIG. 2. From this results a brewed beverage having a comparatively large amount of bitter constituents. To avoid repetitions, the other path 27 which the brewing water takes through the second outlet opening will be described hereinbelow.

When an operator desires a less bitter brew, for instance when making coffee, he/she may open the valve 54 farther by rotating the actuating element 73. In this case, the second pin 77 rotates and, through the second opening 75, entrains the slide 66 in its longitudinal direction. This causes the first pin 76, too, to displace by way of the first bore 74 so that the valve piston 56 is rotated in the bore 89 and, simultaneously, in the valve seat 55 by the lever 95. In doing so, the overlapping of the slot 57 with the slot 58 is enlarged such that the brewing water in the secondary chamber 42 can be dispensed to a larger extent out of the secondary chamber 42 and, according to FIG. 2, can flow through the second outlet opening 43 into the collecting groove 26 of the filter unit 2. Naturally, the brewing water takes the same course through the second outlet opening 43 also at a minimum valve position.

After the brewing water has entered the collecting groove 26, it is conveyed through the channel formed between the paper filter 14, the ribs 32 and the inner wall 28 of the filter unit 2, to the outlet opening 30, the channel being also part of the other path 27. Part of the bypass water can also propagate through the outside surface of the paper filter 14 into the product 13 and extract it additionally from the outside area so that the product 13 is used better, without any appreciable bitter materials reaching the brewed beverage.

The larger the overlapping of the slots 57, 58 is, the greater the amount of brewing water is which discharges from the secondary chamber 42, and the smaller the amount of brewing water is which flows directly through the upper surface 53 of the product 13 (FIG. 2). The valve 54 is relatively insusceptible to calcareous deposits because the outside wall of the cylindrically extending portion 59 of the valve piston 56 is in close contact with the inner wall of the valve seat 55, and because of the rigid design of the recessed portion 59. That means, an operator can influence the taste of the brewed beverage by adjusting the valve 54 so as to have more or less bitter constituents in the brew.

Of course, instead of the valve described hereinabove, it is also possible to integrate any other valve into the beverage brewing machine shown in FIG. 1 to control the discharge out of the conduit 16.

We claim:

1. A beverage brewing machine comprising storing tank structure, brewing structure, supply reservoir structure, an electric heating device coupled to said supply reservoir structure, said supply reservoir structure having a bottom and being adapted to receive water to be heated by said electric heating device, outlet valve structure coupled to said supply reservoir structure for controlling flow of brewing water out of said supply reservoir structure onto the upper surface of a product, preferably ground coffee or tea leaves, contained in said brewing structure, from which, after extraction of the product, the so prepared brewed beverage finally discharges into said storing tank structure, siphon-like conduit structure coupled to said supply reservoir structure through which brewing water can propagate also along a path in said brewing structure out of said supply reservoir structure into said storing tank structure, other than through the upper surface of the product, said siphon-like conduit structure having a vertex disposed above said bottom of said supply reservoir structure, such that, only starting with a defined filling level in said supply reservoir structure, brewing water discharges also through said siphon-like conduit structure and not only through the upper surface of the product in said brewing structure.

2. The beverage brewing machine of claim 1 wherein said siphon-like conduit structure is made of a flexible material and is sized sufficiently long so that said vertex of said conduit in respect to said bottom of said supply reservoir structure can be adjusted to various levels by the user of said beverage brewing machine.

3. The beverage brewing machine of claim 1 wherein brewing water flows also through said siphon-like conduit structure only starting with a filling level of at least 20% of the maximum capacity of water in said supply reservoir structure.

4. The beverage brewing machine of claim 3 and further including outlet pipe structure connected downstream of said outlet valve structure, the opening cross-section of said siphon-like conduit structure in relation to the opening cross-section of said outlet pipe structure being between 35% and 50%.

5. The beverage brewing machine of claim 1 wherein said siphon-like conduit extends through said supply reservoir structure.

6. A beverage brewing machine comprising supply reservoir structure for receiving cold water, heater structure coupled to said supply reservoir structure for heating cold water flowing out of said supply reservoir structure, distribution structure, brewing structure having an outlet opening, storing tank structure for communication with said outlet opening of said brewing structure, feed pipe structure for conveying brewing water from said heater structure to said distribution structure, said distribution structure containing partition wall structure, said partition wall structure subdividing said distribution structure into a main chamber and a secondary chamber, the entire brewing water flowing from said feed pipe structure into said main chamber, a first outlet opening in said main chamber and a second outlet opening on the opposite side of said partition wall structure from said first outlet opening in said secondary chamber, brewing water, on the one hand, flowing from said distribution structure through said first outlet opening onto the upper surface of a product, preferably tea leaves or ground coffee, contained in said brewing structure, from which, after extraction of the product, the so prepared brewed beverage finally discharges into said storing tank structure, and brewing water, on the other hand, can also flow from said distribution structure through said second outlet opening after having surmounted said partition wall structure, this portion of the brewing water propagating along a path other than through the upper surface of the product into said brewing structure, said distribution structure having closed chamber structure, and vent pipe structure for maintaining said closed chamber structure in constant communication with the atmosphere, said vent pipe structure penetrating the bottom of said closed chamber structure and having a free end which is disposed above the upper edge of said partition wall structure, said pipe vent structure being fitted in said main chamber adjacent said first outlet opening.

7. The beverage brewing machine of claim 6 wherein the surface of said second outlet opening is smaller than the surface of said first outlet opening.

8. The beverage brewing machine of claim 7 wherein the dimensions of said first and second outlet openings are such that after the first overflow of brewing water out of said main chamber into said secondary chamber, 10% to 40% of the brewing water which is then delivered to said main chamber discharges through said second outlet opening.

9. The beverage brewing machine of claim 6 wherein the end of said second outlet opening is directed to a peripheral edge of said brewing structure, and further including channel structure at said peripheral edge for forming said other path for the brewing water.

10. The beverage brewing machine of claim 9 and further including a water-permeable filter insert containing the product for disposition in said brewing structure, said channel structure being formed by the outside of said filter insert and by the inner edge of said brewing structure, and spacer structure for determining the width (W) of said channel structure, said spacer structure being sized such that the product in said filter insert is wetted laterally by the brewing water.

11. The beverage brewing machine of claim 10 wherein said channel structure extends over at least a majority of the circumference of said peripheral edge of said brewing unit.

12. The beverage brewing machine of claim 11 wherein on the inlet side, said channel structure includes collecting groove structure which extends beneath the upper edge of said filter insert and which is opposite said second outlet opening and, on the outlet side terminates into said outlet opening of said brewing structure.

13. The beverage brewing machine of claim 6 wherein said heater structure delivers water at a rate of 3.5 to 6 millimeters per second, the total surface area of said main chamber and said secondary chamber is between twenty and forty square centimeters, the ratio of the surface areas of said main chamber and said secondary chamber is in the order of 4:1 to 8:1, the height of said partition wall structure is in the range of six to twelve millimeters, the surface area of said first outlet opening ranges between seven and fourteen square millimeters, and the surface area of said second outlet opening ranges between four and thirteen square millimeters.

14. The beverage brewing machine of claim 13 wherein said heater structure supplies a quantity of about 4.5 milliliters of water per second at a power of about 1250 watts, the total surface of said main chamber and said secondary chamber is approximately thirty square centimeters, the surface area of said main chamber amounts about twenty-five square centimeters and the surface area of said secondary chamber amounts to about 4.5 square centimeters, the height of said partition wall is about eight millimeters, the surface area of said first outlet opening is about eleven square millimeters, and the surface area of said second outlet opening is about eight square millimeters.

15. The beverage brewing machine of claim 6 and further including at least one baffle in said main chamber, said baffle containing at least one aperture which lies about at the level of the bottom of said distribution structure.

16. The beverage brewing machine of claim 6 and further including valve structure in said distribution structure which permits control of the discharge of brewing water along said other path.

17. The beverage brewing machine of claim 16 wherein said valve structure controls the passage of brewing water, but always ensures a minimum passage.

18. The beverage brewing machine of claim 16 wherein said valve structure can be adjusted by the user of the beverage brewing machine within such limits that, at a sufficient filling level, 10% to 40% of the brewing water is dispensed through said second outlet opening.

19. The beverage brewing machine of claim 16 wherein said valve structure controls the cross-sectional size of said second outlet opening and is provided at said second outlet opening.

20. The beverage brewing machine of claim 19 wherein said valve structure is composed of valve seat structure in the housing of said distribution structure and a valve piston for sealingly closing said valve seat structure, said valve piston and said valve seat structure each being furnished with an aperture, said apertures determining the opening cross-section of said valve depending on the degree they overlap each other.

21. The beverage brewing machine of claim 20 wherein said valve seat structure is formed by a bore and said valve piston has a cylindrical portion which is sealedly guided in said bore, each of said bore and said cylindrical portion being provided with a said aperture, and rotation of said valve piston about its longitudinal axis (Y) is adapted to place said aperture of said valve piston in alignment with said aperture of said valve seat structure.

22. The beverage brewing machine of claim 21 and further including actuating structure for rotating said valve piston about its longitudinal axis (Y) to control said valve structure.

23. The beverage brewing machine of claim 22 and further including slide structure which eccentrically engages said valve piston, said actuating structure being rotatable about an axis of rotation (X) shifted in parallel to said longitudinal axis (Y), and the transmission of rotation of said actuating structure to said valve piston being effected by said slide structure.

24. The beverage brewing machine of claim 23 wherein slide structure includes first and second apertures, said valve piston includes a first pin outside said longitudinal axis (Y) of said valve piston engaging said first aperture, and said actuating structure includes a second pin outside the axis of rotation (X) of said actuating structure engaging said second aperture.

25. The beverage brewing machine of claim 22 wherein said distribution structure includes a cover, and guide structure for guiding said slide structure at said cover of said distribution structure.

26. The beverage brewing machine of claim 22 wherein said supply reservoir structure extends substantially up to the upper edge of said beverage brewing machine, and said actuating structure is guided at the upper edge of said supply reservoir structure.

27. The beverage brewing machine of claim 26 wherein said supply reservoir structure includes cover structure which covers said actuating structure.

28. The beverage brewing machine of claim 26 wherein said supply reservoir structure includes cover structure, said cover structure containing an opening through which said actuating structure is operable from the outside.

29. A beverage brewing machine comprising supply reservoir structure for receiving cold water, heater structure coupled to said supply reservoir structure for heating cold water flowing out of said supply reservoir structure, distribution structure, brewing structure having an outlet opening, storing tank structure for communication with said outlet opening of said brewing structure, feed pipe structure for conveying brewing water from said heater structure to said distribution structure, said distribution structure containing partition wall structure, said partition wall structure subdividing said distribution structure into a main chamber and a secondary chamber, the entire brewing water flowing from said feed pipe structure into said main chamber, a first outlet opening in said main chamber and a second outlet opening on the opposite side of said partition wall structure from said first outlet opening in said secondary chamber, brewing water, on the one hand, flowing from said distribution structure through said first outlet opening onto the upper surface of a product, preferably tea leaves or ground coffee, contained in said brewing structure, from which, after extraction of the product, the so prepared brewed beverage finally discharges into said storing tank structure, and brewing water, on the other hand, can also flow from said distribution structure through said second outlet opening after having surmounted said partition wall structure, this portion of the brewing water propagating along a path other than through the upper surface of the product into said brewing structure, and valve structure in said distribution structure which permits control of the discharge of brewing water along said other path, said valve structure controlling the cross-sectional size of said second outlet opening and being provided at said second outlet opening.

30. The beverage brewing machine of claim 29 wherein said valve structure is composed of valve seat structure in the housing of said distribution structure and a valve piston for sealingly closing said valve seat structure, said valve piston and said valve seat structure each being furnished with an aperture, said apertures determining the opening cross-section of said valve depending on the degree they overlap each other.

31. The beverage brewing machine of claim 30 wherein said valve seat structure is formed by a bore and said valve piston has a cylindrical portion which is sealedly guided in said bore, each of said bore and said cylindrical portion being provided with a said aperture, and rotation of said valve piston about its longitudinal axis (Y) is adapted to place said aperture of said valve piston in alignment with said aperture of said valve seat structure.

32. The beverage brewing machine of claim 31 and further including actuating structure for rotating said valve piston about its longitudinal axis (Y) to control said valve structure.

33. The beverage brewing machine of claim 32 and further including slide structure which eccentrically engages said valve piston, said actuating structure being rotatable about an axis of rotation (X) shifted in parallel to said longitudinal axis (Y), and the transmission of rotation of said actuating structure to said valve piston being effected by said slide structure.

34. The beverage brewing machine of claim 32 wherein said supply reservoir structure extends substantially up to the upper edge of said beverage brewing machine, and said actuating structure is guided at the upper edge of said supply reservoir structure.

35. The beverage brewing machine of claim 34 wherein said supply reservoir structure includes cover structure, said cover structure containing an opening through which said actuating structure is operable from the outside.

* * * * *